1F-151 S-
12/7/87 V3 -E 7,341

United States Patent [19]

Smith

[11] E Patent Number: Re. 32,341

[45] Reissued Date of Patent: Jan. 27, 1987

[54] DISCO LIGHT ASSEMBLY

[76] Inventor: Robert M. Smith, 1443 Centinela Ave., Santa Monica, Calif. 90404

[21] Appl. No.: 588,914

[22] Filed: Mar. 12, 1984

Related U.S. Patent Documents

Reissue of:

[64] Patent No.: 4,389,598
Issued: Jun. 21, 1983
Appl. No.: 233,173
Filed: Feb. 10, 1981

[51] Int. Cl.[4] ..... G05F 1/00; H05B 37/02; H05B 39/04; H05B 41/36

[52] U.S. Cl. ..... 315/291; 84/464 R; 315/161; 315/174; 315/294; 362/811; 315/320

[58] Field of Search ..... 315/161, 174, 175, 176, 315/201, 250, 291, 293, 294, 317, 323; 84/464; 340/148; 362/811

[56] References Cited

U.S. PATENT DOCUMENTS

| | | | |
|---|---|---|---|
| 3,154,721 | 10/1964 | Sommeria | 315/176 X |
| 3,243,650 | 3/1966 | Hawkins et al. | 315/161 X |
| 3,828,221 | 8/1974 | Spiteri | 315/161 |
| 3,869,699 | 3/1975 | Haller et al. | 315/294 X |
| 4,158,793 | 6/1979 | Lewis | 315/174 |
| 4,362,971 | 12/1982 | Sloan, Jr. | 315/176 |
| 4,417,182 | 11/1983 | Weber | 315/323 |

FOREIGN PATENT DOCUMENTS

| | | | |
|---|---|---|---|
| 54-24469 | 2/1979 | Japan | 315/291 |
| 54-58975 | 5/1979 | Japan | 315/291 |
| 2036470 | 6/1980 | United Kingdom | 315/323 |

OTHER PUBLICATIONS

*Star Spinner,* Popular Electronics, vol. 17, No. 2, Feb. 1981, pp. 42–46.

Link, *Discotheque Lighting Controlled by Prom,* Electronic Engineering, Apr. 1975, p. 31.

*Primary Examiner*—Saxfield Chatmon
*Attorney, Agent, or Firm*—Keith D. Beecher

[57] ABSTRACT

A disco light assembly is provided which includes a multiplicity of individual electric lamps formed in a circle, or in any other appropriate configuration, and which are illuminated in any desired sequence in response to a disco beat. The individual lamps are preferably of the high intensity type, and each generates a shaft of light, preferably white, when illuminated. A common regulated power supply is provided which supplies a continuous filament current to all the lamps which is of sufficient amplitude to maintain the filaments in a warm state but insufficient to illuminate the lamps. Each lamp has its own control module connected to the common power supply, and when a module is triggered, it causes a high current pulse to be introduced to the corresponding lamp for a few milliseconds, followed by a power current of sufficient intensity to illuminate the lamp. The power current continues for so long as the lamp is to be illuminated. A rapid turn-on circuit is included in each module, so that each lamp is quickly turned on without creating any undue thermal stress in the lamp filament. However, the lamps turn off at a relatively slow rate. This obviates irritating strobe light effects.

18 Claims, 10 Drawing Figures

22
R.F. CHOKE
H'
10
J'
B'
24
CR7
Fuse F2
F(1.8V)G (FILAMENT)
CR6
Fuse F1
CR4
SW2
E(6.5) (POWER)
Q2
R1
D'
D(21V) (PULSE)
SW1
R4
Q5
Q4
R2
Common
Q3
20
FAST TURN -ON CIRCUIT
(FIG.6)
-7V
C'
CR212
CR2
CR1
Q1
A'
SIGNAL FROM CONTROL CIRCUIT (FIG.10)

POWER MODULE -14-
(ONE FOR EACH LAMP)

12 ms
FAST TURN ON 21V
RMS (VOLTAGE)
POWER 6.5VRMS
STANDBY 1.8VRMS
TIME

FAST TURN-ON CIRCUIT-20-
(SECOND EMBODIMENT)
VARIABLE WIDTH

FAST TURN-ON CIRCUIT
(THIRD EMBODIMENT)

FAST TURN-ON CIRCUIT-20-
(FIRST EMBODIMENT)
INVERTER
RECTIFIER
COMPARATOR
ADD
FILTER
RECTIFIER
R.F. CHOKE
Common
Lockout
Logic Signal
To Lamp
RF Choke
6 OR 12 ms
6 ms
12 ms
100 ms
300 ms
timer

DISCO LIGHT ASSEMBLY

Matter enclosed in heavy brackets [ ] appears in the original patent but forms no part of this reissue specification; matter printed in italics indicates the additions made by reissue.

BACKGROUND

Systems have been provided in the past which attempt to coordinate colors with sounds, and more specifically to cause differently colored electric lights to be energized in response to musical tones of different predetermined frequencies. The overall effect of such a display system is a spectacular harmonizing of color illuminations with musical sounds. Musical tones are converted into corresponding electrical signals in the systems, and the electrical signals are selectively filtered so as to control the energization of different groups of colored lights. In this way, different color illumination effects are obtained in synchronism with tonal variations of the music emanating from the particular musical source. An example of such a prior art system may oe found in U.S. Pat. No. 3,845,468 which issued Oct. 29, 1974 in the name of the present inventor.

Other systems have been devised in the past in which lamps generating white light are selectively energized in response to a musical beat to create mobile, dynamic and exciting illuminating effects. The system of the present invention is of this latter type and, as explained above, it provides an improved control system for selectively activating a plurality of individual electrical lamps in order to create unusual wild and spontaneous effects.

DETAILED DESCRIPTION OF THE ILLUSTRATED EMBODIMENTS

Figure 1:
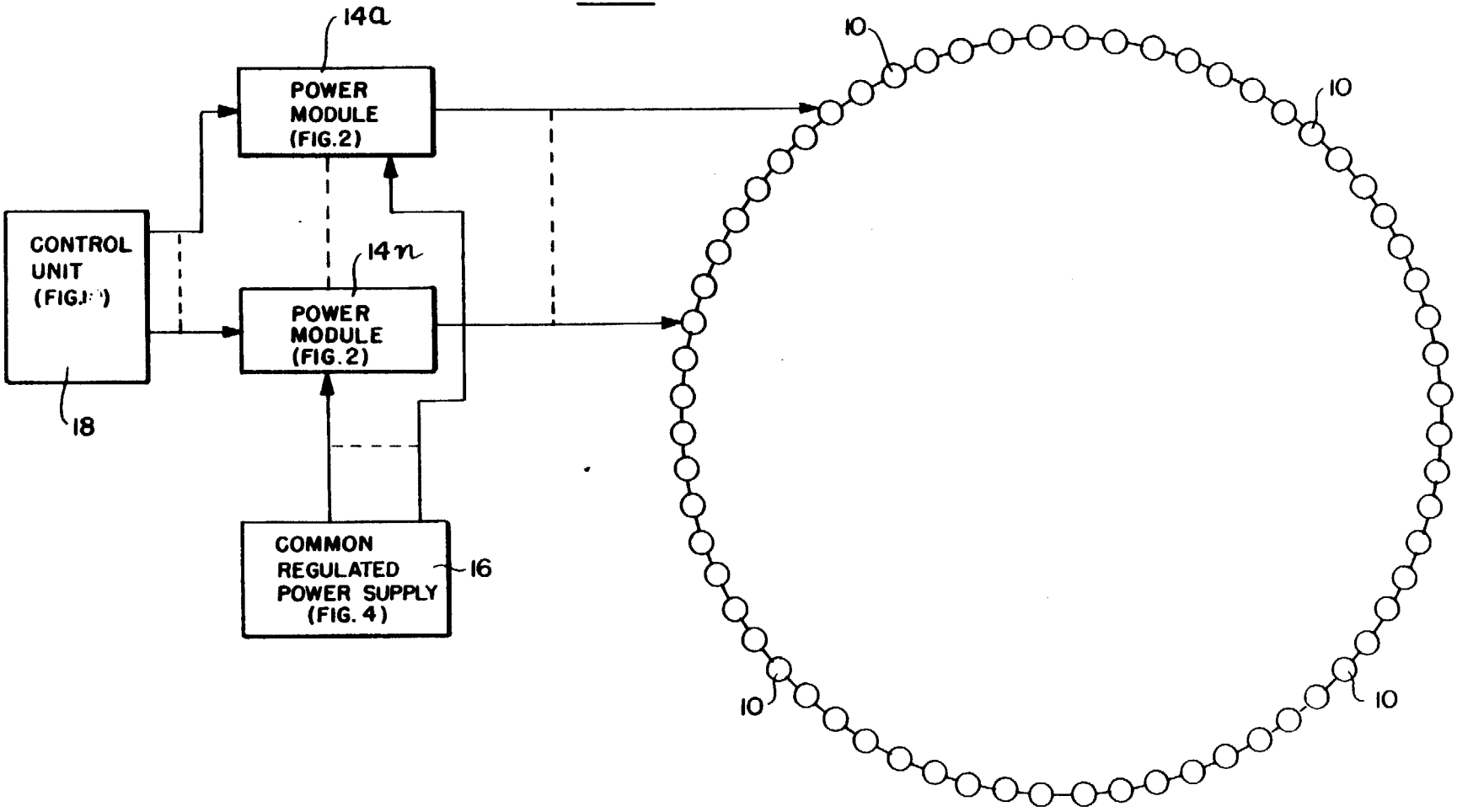
FIG. 1 is a block diagram of a light assembly and associated control units, in accordance with the teachings of the present invention.

The particular assembly shown in FIG. 1 includes a series of 64 electrical lamps 10 formed in a ring, although any other formation is feasible. A corresponding plurality of power modules 14a–14n are respectively connected to the individual lamps 10. A common power supply 16 is provided for the power modules. The power modules are selectively activated by a control unit 18 which responds to the beat the the disco music in the environment in which the assembly is installed. The lamps 10 are preferably high intensity sealed beam white spotlights, and may be provided, for example, in rings of 64, 32, 16, 8 or 4 lamps, or any other desired number, as desired. Each of the lamps is quickly turned on in response to the control by the control unit 18 of its associated power module 14, but each lamp cools down over a normal time interval after being de-energized. This eliminates unwanted strobe effects.

When placed in a ring configuration, such as shown in FIG. 1, the assembly may be controlled to generate a white shaft of light that responds instantly to the beat of the disco music to create an exciting maypole type of light show. The assembly can be controlled such that the effect of a single lamp traveling around the ring at high speed, for example, of the order of one revolution per second, can be produced, with no mechanical motion. A speed control knob is provided, as will be described. The ring may be divided into a number of sections, as will also be described, so that different lamps can be illuminated in different sequences in each section, moving in either the same direction or opposite directions. The assembly can also be controlled so that a single lamp can be made to perform as a giant metronome with each beat of the music.

Figures 2, 3, 4:
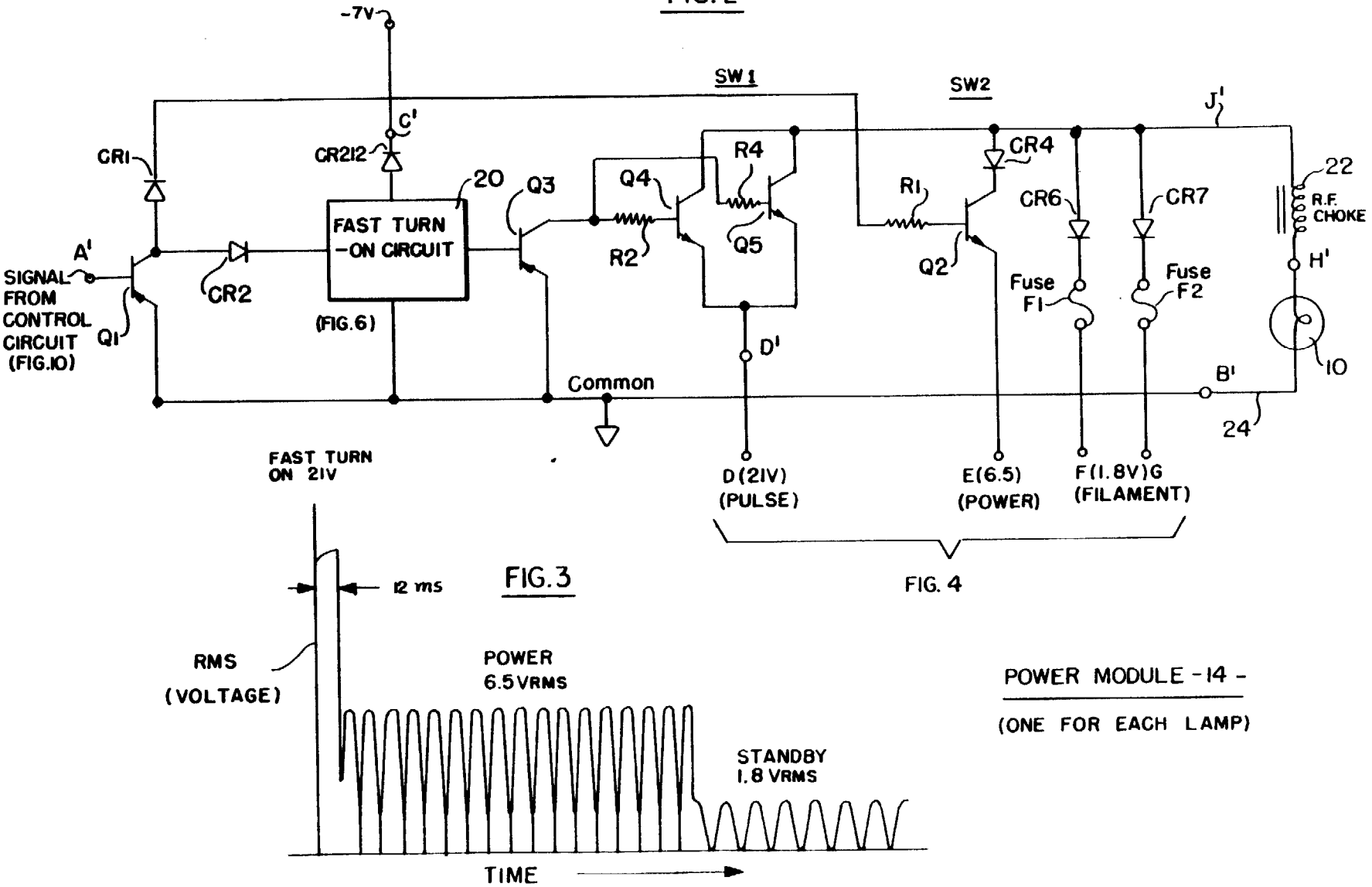
FIG. 2 is a circuit diagram of a power module which is provided in the system of FIG. 1 for each of the electric lamps of the system.
FIG. 3 is a graph showing the waveform of the various voltages applied to the corresponding lamp by the power module of FIG. 2.
FIG. 4 is a circuit diagram of a common regulated power supply which is included in the system of FIG. 1.
Figure 4:
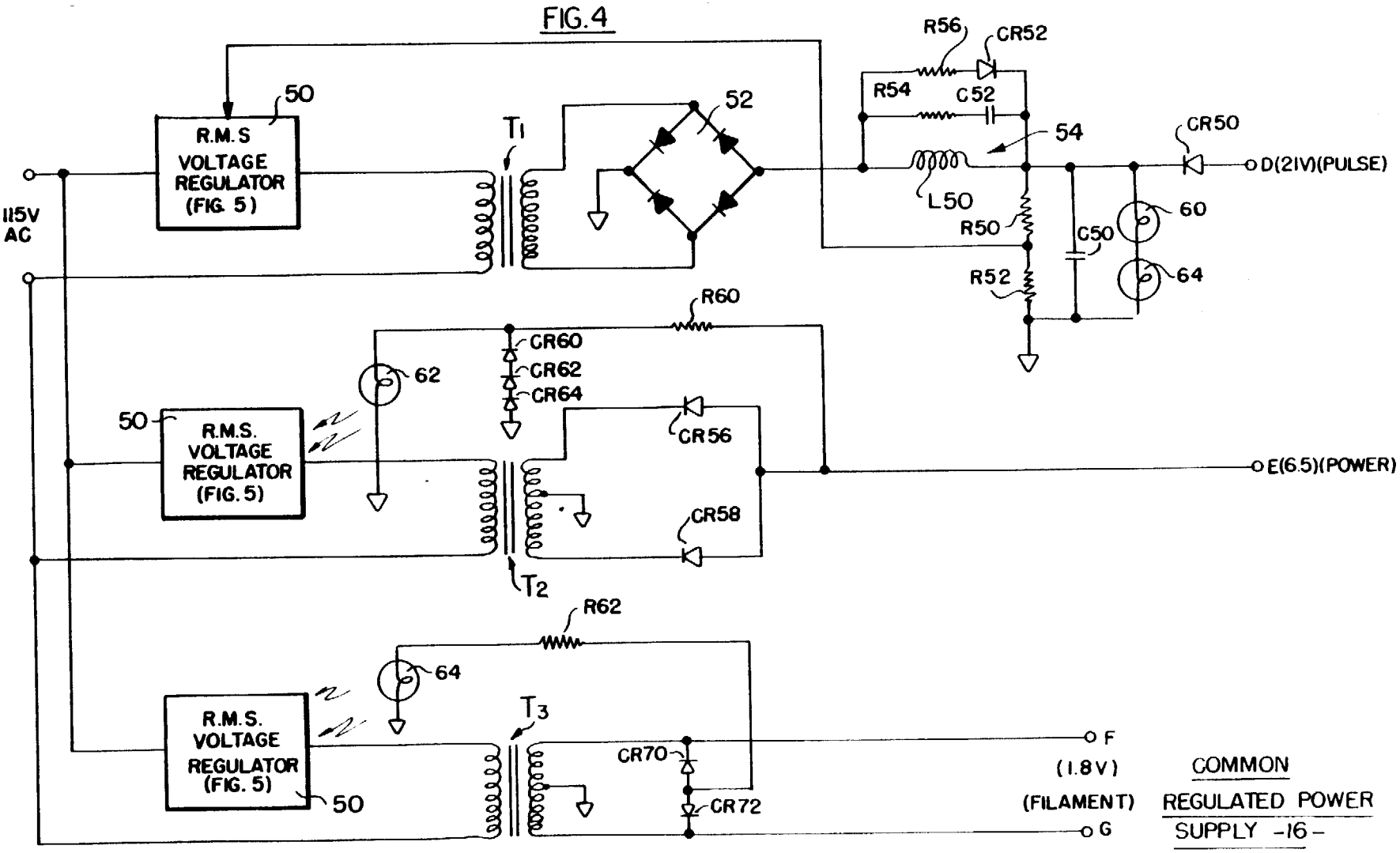
Figure 10:
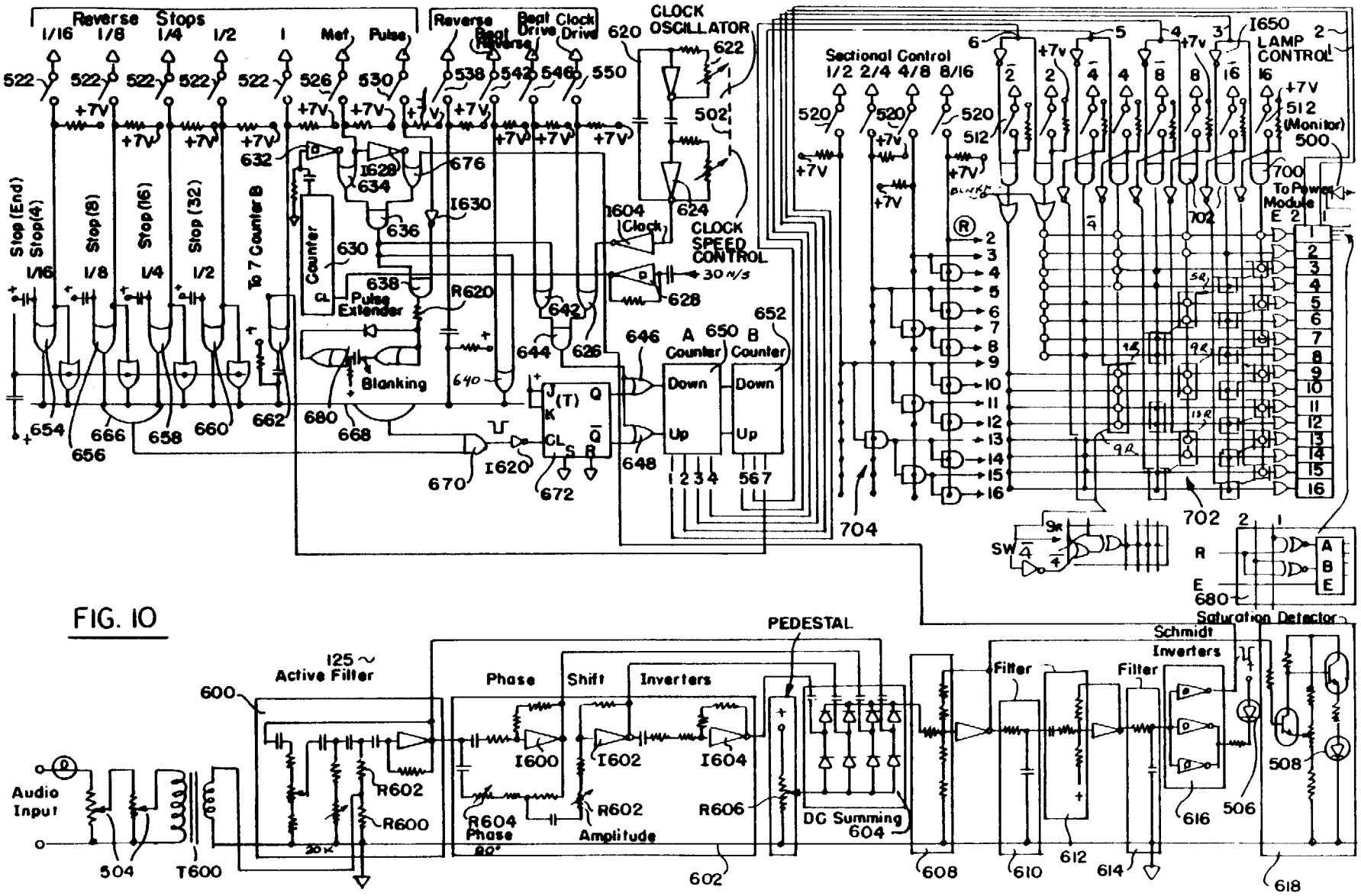
FIG. 10 is a logic diagram of certain control circuitry included in the system.

The circuit diagram for each of the power modules 14a–14n is shown in FIG. 2. In the circuit of FIG. 2, the control signal from the control circuit of FIG. 10, is introduced to the base of a PNP transistor Q1, and whenever the signal appears, the circuitry of FIG. 2 is activated to illuminate it corresponding lamp 10. The emitter of transistor Q1 is grounded, and the collector is connected through a diode CR1, and through a 240 ohm resistor R1 to the base of an NPN transistor Q2. The collector of the transistor Q1 is also connected through a diode CR2 to the input of a fast turn-on circuit designated 20. The output of circuit 20 is connected to the base of a PNP transistor Q3, the emitter of which is grounded. The collector of transistor Q3 is connected through a 510 ohm resistor R2 to the base of a NPN transistor Q4, and through a 510 ohm resistor R4 to the base of an NPN transistor Q5.

Transistors Q4 and Q5 are connected in parallel. The emitters of the transistors are connected to an input terminal designated D, and the collectors are connected through a radio frequency choke coil 22 to lamp 10. Lamp 10 is also connected to the common ground lead 24. Choke coil 22 may have an inductance of 285 microhenries, and a resistance of 0.090 ohms. Lamp 10 may be a General Electric sealed beam spot lamp of the type designated 4515. This lamp is rated at 6.4 volts and 30 watts. The emitter of transistor Q2 is connected to an input terminal E, and the collector is connected through a diode CR4 to the choke coil 22. Further terminals F and G are connected through respective 3 amp fuses F1 and F2, and through corresponding diodes CR6 and CR7, to the choke coil 22.

Transistors Q4, Q5 constitute a first switch, which when activated causes a high pulse of R.M.S. voltage of the order, for example, of 21 volts (FIG. 3) to be applied to the lamp 10 for a brief interval of the order of 12 milliseconds, from the time the cirucit is activated by the control signal from the control circuit. The transistor Q2 constitutes a second switch, and it also is turned on when the signal is received from the control circuit. The latter switch causes a 6.5 volt power signal (FIG. 3) to be applied to the lamp 10, which signal corresponds to the voltage rating of the lamp. The terminals F and G supply a 1.8 volt signal at all times to lamp 10 to maintain the filament of the lamp in a warm condition so as to minimize thermal stress when the lamp is illuminated, and so as to increase the lamp life. The terminals D, E, F and G are connected to the voltage regulated power supply of FIG. 4, which provides a 21 volt R.M.S. signal to terminal D, a 6.5 volt R.M.S. signal to terminal E, and a 1.8 volt R.M.S. signal to terminals F and G.

The circuitry for the common regulated power supply 16 is shown in FIG. 4. The power supply includes three separate transformers T1, T2 and T3, the primary windings of which are connected to the usual 115 volt alternating current source. An R.M.S. voltage regulator 50 is included in each of the primary circuits, the circuit details of regulator 50 being shown in FIG. 5. The secondary winding of transformer T1 is connected to a usual bridge-type full-wave rectifier 52, which, in turn, is connected through a tuned choke circuit 54 and through a diode CR50 to output terminal D. The choke circuit 54 is connected to a pair of resistors R50, R52 which are grounded, and which are shunted by a capacitor C50, and by a pair of lamps 60 and 64.

The circuit 54 includes a choke coil L50 shunted by a capacitor C52 and series resistor R54, resistor R54 having a resistance of 0.375 ohms. The capacitor C52 and resistor R54 are also shunted by a 2 ohm resistor R56 in series with a diode CR52. The tuned choke circuit 54 provides a high power factor, and resistors R50 and R52 and capacitor C50 form a filter. Lamps 60 and 64 may be 28 volt lamps, and serve a bleed-off function. A regulated and fully rectified 21 volt voltage appears at terminal D of the power supply, and this voltage is supplied to the transistors Q4 and Q5 of FIG. 2 to provide the pulse voltage for the lamp 10.

The secondary of transformer T2 is connected to a pair of diodes CR56 and CR58, which, in turn, are connected to the output terminal E. The center tap of the secondary is grounded. The diodes are connected back through a 470 ohm resistor R60 to a lamp 62. Lamp 62 is shunted by a series of diodes CR60, CR62 and CR64 which protect against overdrive of the lamp. The lamp 62 is optically coupled to voltage regulator 50, so that any variation for the rectified 6.5 voltage at terminal E causes the regulator to produce a compensating variation in the primary voltage of transformer T2. Terminal E provides the 6.5 volt power voltage to transistor Q2 in the module of FIG. 2, so that when the module is activated, the lamp 10 may be illuminated for a period of time determined by the time in which transistor Q2 is rendered conductive.

The secondary winding of transformer T3 provides a 1.8 volt voltage at terminals F and G, and this voltage is used to provide standby current to the filament of lamp 10 of an R.M.S. voltage of 1.8 (FIG. 3) so that the filament of the lamp is kept warm at all times, so as to minimize thermal stress and increase the life of the lamp. A pair of diodes CR70 and CR72 are connected across the secondary of transformer T3, and these diodes are connected through a resistor R62 to a lamp 64. The center tap of the secondary of transformer T3 is grounded. Any tendency for the output voltage across the secondary of transformer T3 to vary causes the illumination of lamp 64 to change accordingly. The lamp is optically coupled to the R.M.S. voltage regulator 50, and cause the regulator to produce compensating variations in the primary current of transformer T3.

Figure 5:
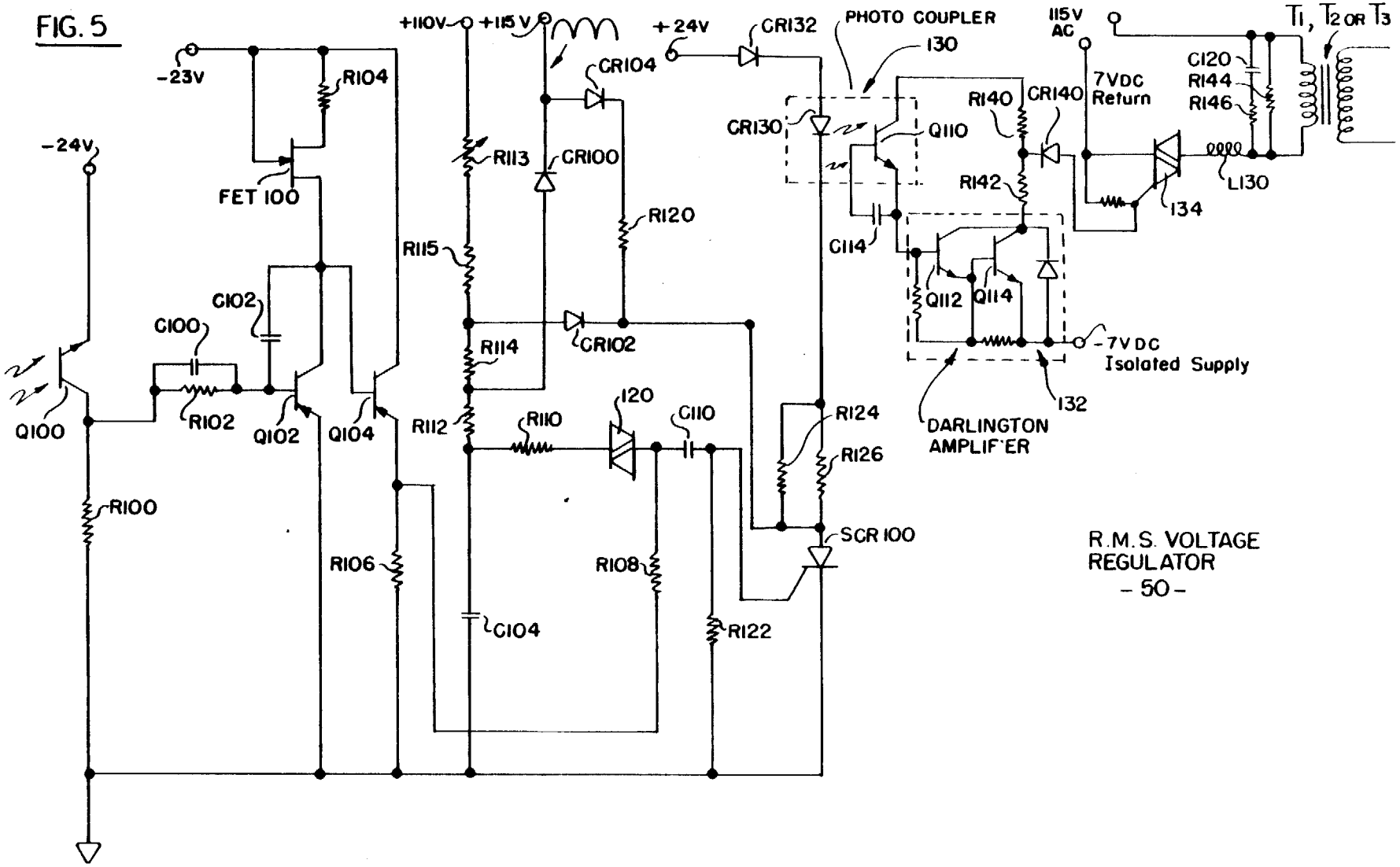
FIG. 5 is a circuit diagram of an R.M.S. voltage regulator, several of which are included in the regulated power supply of FIG. 4.

The circuitry of the R.M.S. voltage regulator 50 is shown in FIG. 5. The circuitry of FIG. 5 includes a photodiode Q100 which may be of the type manufactured by Motorola and designated MRD450. When the circuit is used in the primary of transformer T1, the phototransistor Q100 is replaced by a usual transistor, because photo-coupling is not used in that particular circuit. The collector of transistor Q100 is connected to a grounded 20 kilo-ohm resistor R100, and the emitter is directly connected to a −24 volt voltage source. The collector is also connected through a 10 kilo-ohm resistor R102 to the base of a PNP transistor Q102, resistor R102 being shunted by a 0.022 microfarad capacitor C100. The emitter of transistor Q102 is grounded, and the collector is connected to the drain electrode of a field effect transistor FET100. The source electrode of field effect transistor FET 100 is connected through a resistor R104 to a negative 23 volt voltage source, and the gate is directly connected to that source. The field effect transistor FET 100 may be of the type designated 2N5458. The collector of transistor Q102 is coupled back to the base through a 0.1 microfarad capacitor 102, and to the base of a PNP transistor Q104. The collector of transistor Q104 is directly connected to the 23 volt negative voltage source, and the emitter is connected to a 10 kilo-ohm grounded resistor R106.

The emitter is also connected through a 39 kilo-ohm resistor R108 to a diac 120 which may be of the type designated IN5758. The diac is also connected through a 270 ohm resistor R110 to a further 270 ohm resistor R112. These resistors are connected to a grounded 0.01 microfarad capacitor C104. Resistor R112 is connected through a pair of 1.3 megohm resistors R114 and R115 to a variable 1 megohm resistor R113. Variable resistor R113 is connected to the positive terminal of a 110 volt direct voltage source. The junction of resistors R112 and R114 is connected through a diode CR100 to the positive terminal of a 115 volt direct voltage unfiltered pulsing line source. The junction of resistors R114 and R115 is connected through a diode CR102, through a 27 kilo-ohm resistor R120 and through a diode CR104 to the positive terminal of the 115 volt source. Diode CR102 and resistor R120 are also connected to the anode of the silicon controlled rectifier designated SCR100. The diac 120 is coupled through a 0.0056 microfarad capacitor C110 to the gate of the silicon controlled rectifier. The cathode of the silicon controlled rectifier is grounded, and the gate is connected to a 270 ohm grounded resistor R112.

The anode of the silicon controlled rectifier SCR100 is connected through a pair of 2.4 kilo-ohm parallel resistors R124 and R126 to a photodiode CR130 in a photocoupler 130, and through a diode CR132 to the positive terminal of the 24 volt source. The photocoupler 130 may be of the type designated 4N26, and it includes a phototransistor Q110. The base of the phototransistor is coupled to the emitter through a 0.001 microfarad capacitor C114. The collector is connected to a resistor R140 of 510 ohms, which, in turn, is connected through a 60 ohm resistor R142 to the collectors of a pair of parallel connected NPN transistors Q112 and Q114 which are contained in an integrated circuit chip 132 which may be of the type designated 2N6386, and which form a Darlington amplifier. The emitter of transistor Q110 is connected to the base of transistor Q112.

The junction of resistors R140 and R142 is connected through a diode CR140 to the gate electrode of a triac 134. The cathode of the triac is connected to one side of the 115 volt alternating current source, and the anode is connected through a radio frequency choke coil L130 to the primary winding of transformer T1, T2 or T3. The primary winding is shunted by a resistor R144 which has a resistance, for example, of 2.25 kilo-ohms. The primary is also shunted by a 100 ohm resistor R146 and a 0.1 microfarad capacitor C120 connected in series with the resistor.

The voltage regulator circuit of FIG. 5 controls the voltage across the secondary of the transformer T1, T2 or T3 to maintain a constant R.M.S. voltage, by controlling the amount of power actually fed to the primary of the transformer during each half-cycle of voltage from the 115 volt alternating current source. This is achieved by firing the triac 134 at selected times in each half-cycle, so that more or less power is supplied to the primary of the transformer in order to maintain a constant R.M.S. voltage output. The gate signal applied to the triac persists for the whole interval during which the triac is conductive to avoid false turn off to the triac because of the inductive nature of its load.

As described above, the current through the phototransistor 100 is controlled to be a function of the output voltage by a photocoupling arrangement with respect to the transformers T2 and T3 in FIG. 4, and by a direct control with respect to the transformer T1. In each instance, the voltage across resistor R100 is a measure of the output voltage of the corresponding power supply. This voltage is amplified by transistor Q102, and the amplified voltage appears across resistor R106 in the emitter circuit of the decoupling emitter follower Q104.

The field effect transistor FET 100 in the collector circuit of transistor Q102 provides a constant current source, so that extremely high gain may be realized by the transistor Q102 in excess of 2,000. The voltage across resistor R106 is supplied to one side of diac 120. An increasing voltage is supplied to the other side of diac 120 as capacitor C104 is charged from the positive terminal of the 110 volt direct voltage source through resistors R112, R114, R115 and R113.

So long as the diac 120 is not conductive, the capacitor C104 discharges through diode CR100 to the positive 115 voltage source which is in phase with the 115 volt alternating current source to which the primary circuit of the transformer is connected, but which is rectified but unfiltered. Capacitor C104 is fully discharged at the end of each half-cycle. A negative voltage appears across resistor R106, and a positive voltage appears across capacitor C104. For each half-cycle of the rectified alternating current voltage, a threshold is reached during which the diac 120 becomes conductive, causing the SCR100 to fire. The point on each half-cycle at which the diac becomes conductive is determined by the magnitude of the negative voltage across resistor R106, which is determined by the output voltage of the power supply. Each time the silicon controlled rectifier SCR100 is triggered, a current flows through the photodiode CR130 in the photocoupler 130, and causes a current flow in the phototransistor Q110. This current flow is amplified in the Darlington amplifier 132 and triggers the triac 134.

In the foregoing manner, the triac 134 is triggered during each half-cycle of the alternating current voltage applied to the primary circuit of the transformer, and at a point on each half-cycle determined by the output voltage, and the effect is to provide a regulating effect to maintain the output secondary voltage constant.

A first embodiment of the fast turn-on circuit is incorporated into the power module 14 of FIG. 2. The circuit of FIG. 6 includes an input terminal designated A' which receives the control signal from the control circuit (FIG. 10). Terminal A' is connected to the base of a PNP transistor Q1, the transistor being of the type designated PN4917. The emitter of transistor Q1 is grounded, and the base is connected to a grounded 10 kilo-ohm resistor R200 and to a grounded 0.001 microfarad capacitor C200.

The collector of transistor Q1 is connected through a diode CR200 to the input of a Schmitt trigger 200, the input being connected through a 20 kilo-ohm resistor R202 to the negative terminal of a 7 volt direct source. The output of Schmitt trigger 200 is coupled through a 0.1 microfarad capacitor C202 and through a 12 kilo-ohm resistor R204 to the input of a Schmitt trigger 202. The junction of capacitor C202 and resistor R204 is connected through 1.2 megohm resistor R206 to the negative terminal of the 7 volt source.

The output of Schmitt trigger 202 is coupled through a 0.022 microfarad capacitor C204 to the input of a Schmitt trigger 206. The input of Schmitt trigger 206 is connected to a grounded 460 kilo-ohm resistor R208. A diode CR204 is interposed between capacitor C204 and the output of Schmitt trigger 202, and a second diode CR206 is connected from the output of Schmitt trigger 200 to the capacitor C204. The junction of diode CR204 and capacitor C204 is connected through a 20 kilo-ohm resistor R210 to the ground lead which is connected to output terminal B'.

Schmitt trigger 206 is coupled through a diode CR210 to the input of a Schmitt trigger 210, diode CR210 also being connected through a 20 kilo-ohm resistor R212 to a common lead designated −7 V which is connected to the negative terminal of the 7 volt source. The terminal C' is actually connected to the negative terminal of the 7 volt direct current source, and a diode CR212 is interposed between that terminal and the common lead designated −7 V.

The output of Schmitt trigger 210 is introduced through a 2.2 kilo-ohm resistor R220 to the base of a PNP transistor Q202 which may be of the type designated PN4917. The base of the transistor is connected to the common ground lead through a 10 kilo-ohm resistor R222, and the emitter is directly connected to the ground lead. A 0.1 microfarad capacitor C208 is connected between the lead designated −7 V and the common ground lead.

The collector of transistor Q1 is connected through a diode CR214, and through a 240 ohm resistor R1 to a Darlington amplifier integrated circuit chip Q2 which may be of the type designated 2N6386, and which includes a pair of transistors, and constitutes a drive amplifier. Likewise, the collector of transistor Q3 is connected through a first 510 ohm resistor R2 to a Darlington amplifier chip Q4, and through a 510 ohm resistor R4 to a Darlington amplifier chip Q5. The outputs of both chips Q4 and Q5 are connected to a terminal designated J' which, as shown in FIG. 2, is connected to the R.F. choke 22. The two chips are connected to a terminal D', which, as shown in FIG. 2, is connected to the negative terminal of a 21 volt direct voltage source.

The output of Schmitt trigger 200 is introduced through a 0.1 microfarad capacitor C220 and through a 12 kilo-ohm resistor R230 to the input of a Schmitt trigger 222. The junction of capacitor C220 and resistor R230 is connected to a grounded 3.9 megohm resistor R232. The output of Schmitt trigger 222 is introduced through a diode CR218 and through a 0.022 microfarad capacitor C224 to the input of a Schmitt trigger 226. The output of Schmitt trigger 200 is also introduced through a diode CR222 and through coupling capacitor C224 to the input of Schmitt trigger 226. The junction of diodes CR222 and CR218 and capacitor C224 is connected to a grounded 20 kilo-ohm resistor R240, and the input of Schmitt trigger 226 is connected to a grounded 820 kilo-ohm resistor R242. All diodes in the circuit of FIG. 6 are of the type designated IN459A.

Figures 6, 7, 8:
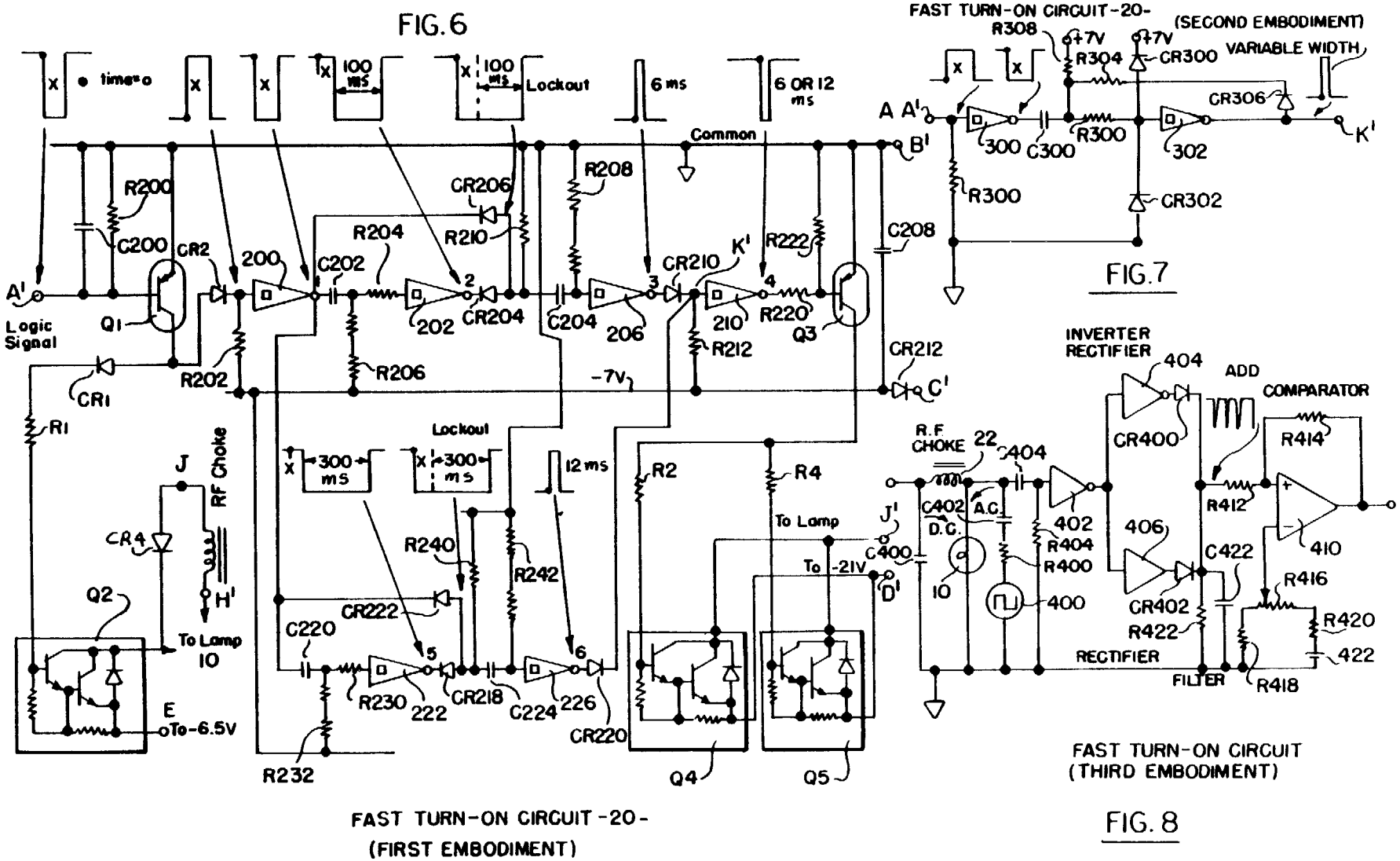
FIG. 6 is a circuit diagram of a fast turn-on circuit included in the power module of FIG. 2.
FIG. 7 is a second embodiment of the fast turn-on circuit.
FIG. 8 is a third embodiment of the fast turn-on circuit.

The circuit of FIG. 6 serves to control the width of te 21 volt fast turn-on pulse of FIG. 3, and it causes that pulse to have a duration of 12 milliseconds when the repetition rate of the control pulses applied to the input of the circuit of FIG. 2 is relatively low, but causes the duration of the turn-on pulse to be reduced to 6 milliseconds in the event the repetition rate of the incoming pulses increases to a relatively high value, thereby protecting the filament of the lamp 10 by reducing the power of the high voltage pulse during intervals when the filament is relatively hot. The circuit of FIG. 6 comprises two parallel Schmitt trigger circuits which lock out one another, so that during the intervals of relatively low incoming pulse rate the lower circuit is active to produce the 12 millisecond output pulses, whereas during the intervals of relatively high incoming pulse rate, the upper circuit is active to produce the 6 millisecond pulses.

The incoming pulse is amplified by Darlington amplifier Q2 in the circuit of FIG. 6. As shown, the output pulse which is applied to Schmitt trigger 200 is amplified and inverted in polarity with respect to the incoming pulse, and is initiated at the same time. The output pulse from Schmitt trigger 200 is again inverted, and is, likewise, initiated at the same time as the input pulse. The Schmitt trigger 200 is triggered on by the trailing edge of the output pulse from Schmitt trigger 200, and is triggered on for, for example, 100 milliseconds, so that its output is a negative-going 100 millisecond pulse whose leading edge corresponds to the trailing edge of the pulse from Schmitt trigger 200. The Schmitt trigger 200 also applies its output pulse to Schmitt trigger 206, so that the latter Schmitt trigger is triggered on at the leading edge of the incoming pulse, to cause it to generate a 6 millisecond pulse at its output whose leading edge also corresponds with the leading edge of the incoming pulse.

However, due to the 100 millisecond lock-out pulse from Schmitt trigger 202, any incoming pulse occurring during the lock-out interval has no effect on the Schmitt trigger 206. Therefore, the circuit is responsive only to pulses below a certain repetition rate. However, if the incoming pulses occur at a relatively slow repetition rate, it is desirable for the pulse produced by the circuit to increase from 6 to 12 milliseconds, so as to provide sufficient rapid turn-on energy to the lamp. For that purpose, the lower Schmitt triggers 222 and 226 take over to produce the illustrated waveforms, with the Schmitt trigger 206 producing a 12 millisecond input pulse to Schmitt trigger 210, so that Schmitt trigger 210 instead of producing a 6 millisecond output pulse, now produces a 12 millisecond output pulse.

The output pulses from the Schmitt trigger 210 are amplified in the circuit of transistor Q3 and its associated Darlington amplifiers Q4 and Q5. The result is the production of output pulses at terminal J' which are used for the rapid turn-on of the lamp 10 in FIG. 2, with these pulses having a duration of 6 milliseconds when the incoming pulse rate is relatively high and 12 milliseconds when the incoming pulse rate is relatively low. It is apparent that more Schmitt trigger circuits can be provided in parallel in the circuit of FIG. 6, so that a variety of pulse widths can be produced at the output terminal H', depending upon the repetition rate of the incoming pulses, so that the filament of lamp 10 is protected against excessive heating effects.

A second embodiment of the fast turn-on circuit 20 is shown in FIG. 7. In the circuit of FIG. 7, the width of the output pulse appearing at terminal K' varies continuously in accordance with the repetition rate of the incoming pulses, so as to maintain a safe thermal stress level in the filament of lamp 10 at all times, as compared with the selective switching from one pulse width to the other as is the case in the circuit of FIG. 6.

In the circuit of FIG. 7, the incoming pulses applied to terminal AA' appear across resistor R300 and trigger a Schmitt trigger circuit 300 to produce a corresponding inverted pulse whose leading edge corresponds with the leading edge of the incoming pulse. The output of Schmitt trigger 300 is coupled through a 0.022 microfarad capacitor C300 and through a 6.2 megohm resistor R300 to the input of a Schmitt trigger 302. The input to the Schmitt trigger 302 is connected through a diode CR300 to the positive terminal of a 7 volt source, and through a diode CR302 to ground. The output of Schmitt trigger 302 is connected to output terminal K', and it produces a positive-going pulse at the output terminal whose leading edge corresponds with the leading edge of the incoming pulse, and whose width varies as the repetition rate of the incoming pulse varies. The output of Schmitt trigger 302 is connected through a diode CR306 through a 1.16 megohm resistor R304 to the junction of capacitor C300 and resistor R300. That junction is also connected through a 44 megohm resistor R308 to the positive terminal of the 7 volt source.

In the operation of the circuit of FIG. 7, the turn-on pulse applied to the input Schmitt trigger 300 causes the output of the Schmitt trigger to be reduced to ground potential causing the R304, C300 timing circuit to pulse the Schmitt trigger 302. The pulse width is 12 milliseconds if C300 has no charge, so that when the repetition rate of the incoming pulses is relatively low the output pulse of Schmitt trigger 302 will have a duration of 12 milliseconds. Charging of the capacitor C300 is terminated at the end of the output pulse due to the path through diode CR306. When the turn-on pulse from Schmitt trigger 300 turns off, capacitor C300 discharges through resistor R300, diode CR300 and resistor R308. Should another turn-on pulse occur before the capacitor C300 has had a chance to discharge completely, the duration of the trigger pulse to the Schmitt trigger 302 will be less, so that the duration of the output pulse correspondingly will be less.

Therefore, any increase in the rate of the incoming turn-on causes the duration of the corresponding output pulses to decrease, and any decrease in the repetition rate of the incoming pulses causes the duration of the output pulse to increase. This provides an automatic pulse duration limit to protect the lamp filament from burn-out. With the circuit described above, and with a constant pulse voltage source for the lamp, the photon output of the lamp is uniform for a wide range of repetition rates of the incoming turn-on pulses.

Another embodiment of the fast turn-on circuit is shown in FIG. 8. This latter circuit connects directly across the lamp 10 isolated by the radio frequency choke 22 and a capacitor C400 connected between the radio frequency choke and ground, and having a capacity of 0.1 microfarads. A high frequency square-wave oscillator 400 supplies a high frequency square-wave of the order of 25 kilocycles through a resistor R400 and capacitor C402 across the lamp 10, as shown. Therefore, the lamp is pulsed by the direct current pulses of FIG. 3 on one hand, and is energized by a high frequency square-wave from source 400.

The lamp and its associated circuitry are coupled through a coupling capacitor C404 to the input of an inverting amplifier 402, the input being connected to a grounded resistor R404. The output of the amplifier 402 is connected to an inverter rectifier circuit including an inverting amplifier 404 and a rectifying diode CR400, and to a non-inverting rectifier including an amplifier 406 and a diode CR402. The outputs from the two rectifiers are combined and applied to the positive input of a comparator 410 through a resistor R412, the output of the comparator being connected back to the positive input through a resistor R414. The negative input to the comparator is connected to a potentiometer R416, one side of which is connected to a grounded resistor R418, and the other side of which is connected through a resistor R420 to the positive terminal of a voltage source 422, the negative terminal of which is grounded. The outputs from the two rectifiers described above appear across a resistor R422 which is shunted by a capacitor C422, the resistor R422 and capacitor C422 constitute a filter for the rectified output; and capacitor C404 and resistor R404 forming a high pass filter.

The alternating current and direct current circuits are isolated from one another by the radio frequency choke 22 and the blocking capacitor C402. As the filament of lamp 10 heats up, its resistance rises, and the signal into the amplifier 402 rises and eventually triggers the comparator 410 which sends a shutdown signal to the fast turn-on circuit 20 of FIG. 2. The comparator reference can be set for any desired filament resistance by potentiometer R416. The circuit of FIG. 8 serves to maintain each of the 21 volt fast turn-on pulses of FIG. 3 on until the filament resistance rises to a predetermined value, representing a particular heat level of the filament, at which time the pulse is turned off.

Figure 9:
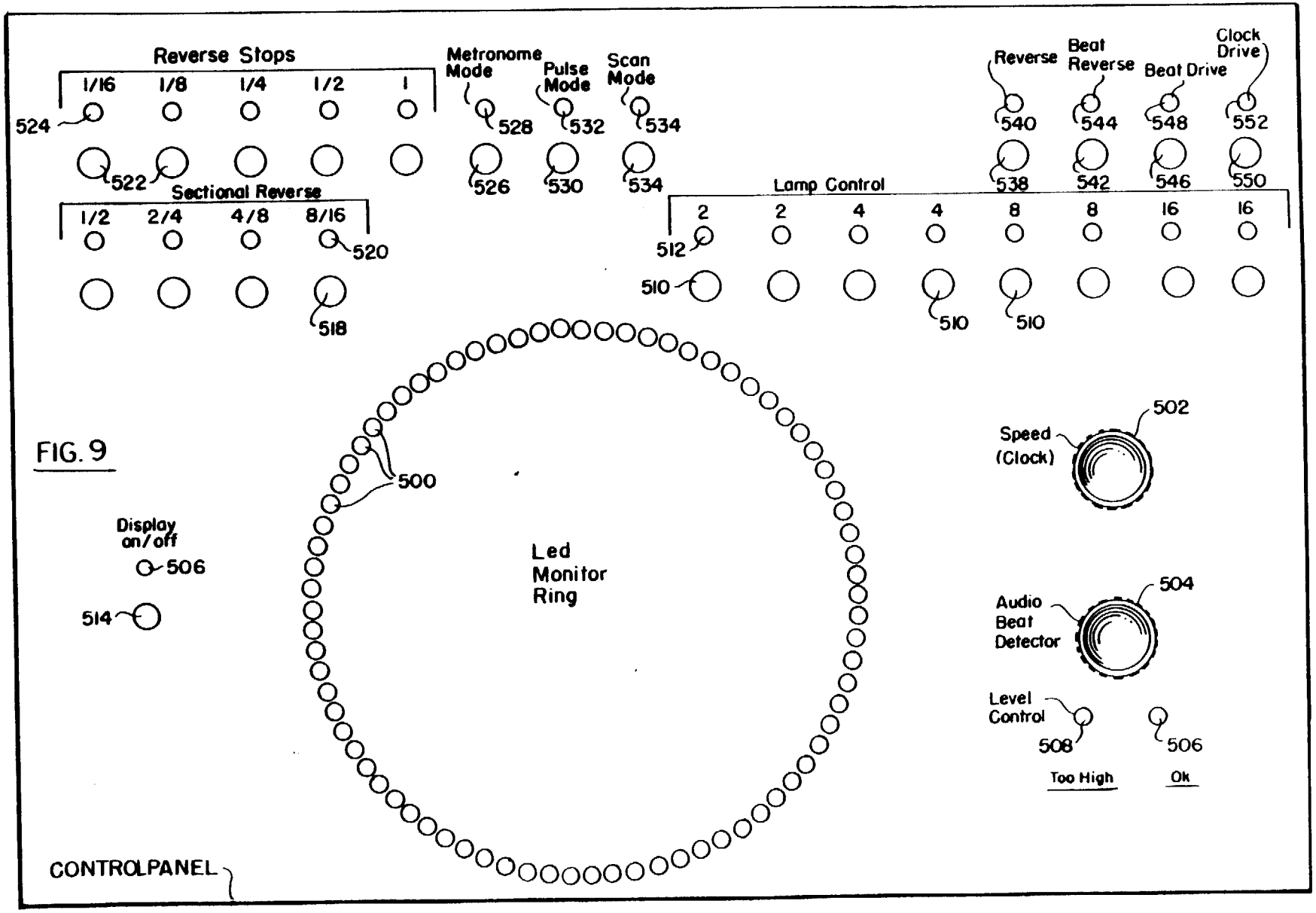
FIG. 9 is a schematic representation of the control panel of the system.

A control panel for the display is shown schematically in FIG. 9. The control panel includes a group of 64 light emitting diodes (LED's) designated 500 which serve as a ring for monitoring the illumination of the lights in the display shown in FIG. 1. A control knob 502 is also mounted on the panel which controls the frequency of a clock oscillator and, thereby, the speed of the light display when the system is in a clock mode. The panel also includes a control knob 504 which controls the audio level control to assure that the audio is not too high to drive the system into saturation. An LED 506 is illuminated when the audio level is at the proper value, and an LED 508 is illuminated when the audio level is too high, so as to drive the system to saturation.

The control panel also includes a number of touch switches 510 which control the number of lamps illuminated in the display at any one time, with reach of the touch switches being accompanied by a corresponding LED 512 which indicates which of the touch switches has been actuated. The control panel also includes a touch switch 514 which turns the display of FIG. 1 on or off, and it is accompanied by an LED 506 which is illuminated when the display is off.

Also included on the control panel is a group of touch switches 518 which provide a reversal of the illuminated lamps on a sectional basis, so that the lamps can give the illusion of traveling either completely around the ring, half-way around the ring, around two segments of the ring, and so on. Each of the switches 518 is accompanied by an LED 520 which is illuminated when the corresponding switch is actuated.

A group of touchj switches 522 serve as reverse stops, and each is accompanied by a light emitting diode 524. A touch switch 526, accompanied by an LED 528, is used to set the system to a netronome mode, in which it responds to clock pulses, rather than to the beat of the music. A touch switch 530 accompanied by an LED 532 sets the system to a pulse mode in which a strobe effect is created. A switch 534 accompanied by an LED 536 sets the system to a scan mode by which the system automatically slowly scans all the switches 510.

A touch switch 538, accompanied by an LED 540, when actuated, manually causes the lamp activation to reverse, whereas operation of the switch 542, which is accompanied by a LED 544 sets the system to a mode in which the light illumination reverses for each beat of incoming music. A touch switch 546, accompanied by an LED 548 sets the system to a mode in which it responds to the beat of the music, whereas a touch switch 550, accompanied by an LED 552 sets the system to a mode in which it responds to regularly recurring clock signals, rather than to the beat of the music.

To reiterate, therefore, when none of the lamp control touch switches are actuated, a single lamp sequence of illumination proceeds around the LED monitor ring. When the touch switches 510 are operated, two or more lamps are activated at the same time, and proceed around the ring, the touch switches providing for two, four, eight or sixteen lamps, for example, to be energized. When the sectional control touch switches 518 are operated, each illumination sequence proceeds for a corresponding segment of the ring, and then reverses in the next segment. This segment, for example, may be one-half, two-quarters, four-eighths, or eight-sixteenths of the ring. The switches 522, when operated, provide for each of the illumination sequences of the lamps to reverse at particular points on the ring, such as one-sixteenth, one-eighth, one-quarter, one-half or around the entire ring.

When the system is set to metronome mode, the light illuminations move back and forth around the ring with a metronome effect, and under the control of the clock pulses, with the music blocked out of the system. The other mode controls are as described above.

The logic circuitry associated with the control panel of FIG. 9 is shown in FIG. 10.

The audio input for the circuit shown in the lower portion of FIG. 10 is derived from the amplifier circuit for the musical source. The incoming audio is applied to the primary of an isolation transformer T600 through a pair of 500 ohm potentiometers which are controlled by the audio level control knob 504 of FIG. 9. The secondary of the transformer is connected to ground, and to the junction of a 51 ohm resistor R600 and a 39 kilo-ohm resistor R602 in a 125 cycle active filter 600. The output of filter 600 is connected to the input of a phase shift circuit 602 which includes three phase shift inverters I600, I602, I604. The phase shift circuit 602 includes a 100 kilo-ohm potentiometer R602 for controlling amplitude, and a 1 megohm potentiometer R604 for controlling phase.

The output of filter 600, together with inverted outputs from the phase shifting network 602 are applied to a DC summing circuit 604 which is connected to a 20 kilo-ohm pedestal potentiometer R606. The output of the DC summing circuit is connected to a DC high bias coupling network 608 which is connected to a low pass filter 610 which, in turn, is connected through a high pass filter 612 and a further low pass filter 614 to three Schmitt inverters included in circuit 616. The uppermost of the inverters develops a negative-going pulse corresponding to each beat of the music represented by the incoming audio. The other Schmitt inverters are connected to LED 506 which is illuminated with each beat.

The filter 608 is also connected to a saturation detector circuit 618 which causes LED 508 to be illuminated when the system is in a saturation condition and, when that occurs, the operator adjusts the potentiometer control 504 until the LED 508 is extinguished, and the LED 506 is illuminated, to indicate the proper audio level.

The system includes a clock oscillator 620, the frequency of which is controlled between, for example, 7 cycles and 80 cyles per second, by a pair of 2 megohm potentimeters 622 and 624 which, in turn, are controlled by the knob 502 on the control panel of FIG. 9, The clock output from the clock oscillator is applied to an inverter I604, the output of which is connected to an "or" gate 626. A 30 cycle per second signal is developed by a Schmitt trigger oscillator 628, and the resulting pulse output from the Schmitt trigger is used to clock a counter 630. Counter 630 may be a 14 stage binary ripple counter to the type manufactured, for example, by RCA and designated CD4020BE. The output of counter 630 is applied to a Schmitt trigger 632 whose output is applied to an "or" gate 634.

The output of "or" gate 634 is connected to an "and" gate 636 whose output is connected to an "and" gate 638, to an "or" gate 640, and to an "or" gate 642. "Or" gates 642 and 626 are connected to an "and" gate 644 which, in turn, is connected to a pair of "or" gates 646 and 648. The "or" gates 646 and 648 are connected to the respective down and up terminals of up-down counters 650 (counter A) and 652 (counter B). The counters constitute a four-stage binary up/down synchronous counter of the type manufactured by RCA and marketed under the designation CD40193BE.

The reverse stop touch switches 522 are connected to respective "or" gates 654, 656, 658, 660 and 662, and the seven step output of counter 652 is also connected to "or" gate 662. The "or" gates 654, 656 and 658 are connected to an "and" gate 666, and the "or" gates 660, 662 and 640 are connected to an "and" gate 668. ∫And" gates 666 and 668 are connected to an "and" gate 670 which, in turn, is connected through an inverter I620 to the clock input of a flip-flop 672.

The metronome touch switch 526 is connected to "or" gate 634, and through an inverter I624 to a second "or" gate 676. The pulse touch switch 530 is connected through an inverter I630 to "and" gate 638. The reverse switch 538 is connected to "and" gate 668, and the beat reverse touch switch 642 is connected to "or" gate 640. The beat drive touch switch 546 is connected to "or" gate 642, and the clock drive switch 550 is connected to "or" gate 626.

"And" gate 638 is connected trough a 43 kilo-ohm resistor R620 to a pulse extender circuit 680. The #1 and #2 outputs of the up/down counter 650 are connected to a series of block 1-16. The blocks 1-16 include circuitry such as shown in rectangular 680, and each block supplies outputs to four modules controlling a corresponding four of the 64 lamps of the ring of FIG. 1, so that 16 blocks are used in the circuit to control the 64 lamps. In the lead to each power module is an LED 500 constituting one of the LED's of the monitor ring on the control panel of FIG. 9, and a 470 ohm limiting resistor.

The #3 output of counter 650 is introduced to an "and" gate 700, and through an inverter I650 to an "and" gate 702. The touch switches 512 for the 16 lamp control are also connected respectively to the "and" gates 700 and 702. Similar connections are made for the #4, #5 and #6 outputs of the counters 650 and 652, as shown in the upper right-hand corner of FIG. 10. The outputs of the "and" gates are connected to an appropriate matrix 702, as shown, which, in turn, is connected to the respective blocks 1-16.

The sectional control switches 520 are also connected to an appropriate matrix 704. The outputs of matrix 704 are designated R, and are introduced to the corresponding blocks, as designated by the numbers on the right-hand side of the matrix. The outputs of matrix 702 are designated E, and are introduced to the various blocks, as shown.

It will be appreciated that although certain embodiments of the system of the invention have been shown and described, modifications may be made, and it is intended in the claims to cover all modifications which come within the true spirit and scope of the invention.

What is claimed is:

1. A *rapid turn-on* control system for selectively energizing a plurality of *filament-type* electric lamps including: power supply means; a plurality of control modules connected to said power supply means for respectively energizing respective ones of said lamps; and control circuitry connected to said control modules for causing the control modules selectively to activate the lamps, each of said control modules including: [first circuit means for supplying a continuous electric current to the corresponding lamp within an amplitude sufficient to maintain the filament of the lamp in a warm state but insufficient to illuminate the lamp, second circuit means including switching means responsive to control pulses from said control circuitry for selectively introducing a power current to the corresponding lamp of sufficient intensity to illuminate the lamp, and] circuit means including switching means responsive to [said] control *turn-on* pulses from said control circuitry for *selectively* introducing *high intensity* current pulses to the [corresponding] lamp [filament of a high amplitude as compared with the amplitude of said power current, each of said current pulses being introduced to the lamp filament] *filaments* for a [limited] *relatively brief* time interval; *and further circuit means including switching means responsive to said control turn-on pulses from said control circuitry for selectively introducing power currents to the corresponding lamp filaments of an intensity less than said high intensity current pulses but of sufficient intensity and of a relatively long duration to illuminate each lamp for a predetermined time interval.*

2. The control system defined in claim 1, in which said control circuitry includes clock oscillator means for controlling the production of said control pulses in said control circuitry.

3. The control system defined in claim 1, in which said control circuitry includes circuit means responsive to a musical beat to control the application of the control pulses to the control modules.

4. The control system defined in claim 1, in which said power supply means inlcudes voltage regulator means to maintain the amplitude of the currents supplied to the corresponding lamp at particular predetermined values.

5. The control system defined in claim 1, in which each of said control modules includes further circuit means for controlling the duration of said high current pulses to protect the filament of the corresponding lamp.

6. The control system defined in claim 5, in which said further circuit means includes a plurality of different parallel circuits for causing said high current pulses to have a corresponding plurality of different durations, and switching means for selectively activating different ones of said parallel circuits in accordance with tne repetition rate of the control pulses from said control circuitry.

7. The control system defined in claim 5, in which said further circuit means includes circuitry for continuously varying the duration of each of the high current pulses in accordance with the repetition rate of the control pulses from said control circuitry.

8. The control system defined in claim 5, in which said further circuit means includes circuitry for terminating each of the high current pulses when the filament of the corresponding lamp reaches a particular temperature level.

9. The control system defined in claim 1, in which said control circuitry includes an audio signal circuit for controlling the production of said control pulses in said control circuitry in response to a musical beat.

10. The control system defined in claim 1, in which said control circuitry includes circuit means for controlling the number, sequence and direction of said control pulses produced by said control circuitry, and a plurality of manually operated switches mounted on said control panel for operating said circuit means.

11. The control system defined in claim 1, and which includes a control panel having controls thereon for controlling the number, sequence and direction of energization of the electric lamps by the control system.

12. The control system defined in claim 11, and which includes a light monitor for indicating the number, sequence and direction of energization of the electric lamps by the system.

13. The control system defined in claim 11, in which said control circuitry includes clock oscillator means for controlling the production of said control pulses in said clock circuitry, and audio signal circuitry for controlling the production of said control pulses in said control circuitry in response to a musical beat, and switching circuitry including manually operated switches mounted on said control panel for selectively connecting said clock oscillator means and said audio circuitry into said control circuitry.

14. A *rapid turn-on* control module for [an] electric lamp including: [first circuit means for supplying a continuous electric current to the lamp of an amplitude sufficient to maintain the filament of the lamp in a warm state but sufficient to illuminate the lamp, second circuit means including switching means responsive to control turn-on pulses for introducing a power current to the lamp of sufficient intensity to illuminate the lamp and] third circuit means including switching means responsive to [said] *control* turn-*on pulses for introducing high intensity* current pulses to the lamp filament of a [limited] *relatively brief* duration [and of an amplitude high with respect to the amplitude of the power current]; *and further circuit means including switching means responsive to said control turn-on pulses for introducing corresponding power currents to the lamp filament of an intensity less than said high current pulses but of sufficient intensity and of relatively long duration to illuminate the lamp for a predetermined time interval.*

15. The control module defined in claim 14, and which includes further circuit means for controlling the duration of the high amplitude current pulses to protect the filament of the lamp.

16. The control module defined in claim 15, in which said further circuit means includes a plurality of different parallel circuits for causing said high current pulses to have a corresponding plurality of different durations, and switching means for selectively activating different ones of said parallel circuits in accordance with the repetition of the turn-on pulses to the switching means.

17. The control module defined in claim 15, in which said further circuit means includes circuitry for continuously varying the duration of each of the high current pulses in accordance with the repetition of the turn-on pulses applied to said switching means.

18. The control module defined in claim 15, in which said further circuit means includes circuitry for terminating each of the high current pulses when the filament of the lamp reaches a particular predetermined temperature level.

* * * * *